United States Patent [19]

Denny et al.

[11] Patent Number: 5,479,255
[45] Date of Patent: Dec. 26, 1995

[54] MULTISPECTRAL SIGNATURE EXTRACTION TECHNIQUE

[75] Inventors: Joseph M. Denny, Palos Verdes Estates; Eric L. Upton, Redondo Beach, both of Calif.

[73] Assignee: TRW Inc., Redondo Beach, Calif.

[21] Appl. No.: 991,770

[22] Filed: Dec. 17, 1992

[51] Int. Cl.[6] .................................................. G01J 3/02
[52] U.S. Cl. .................. 356/319; 250/203.1; 250/338.1; 250/342; 356/51; 364/516; 244/3.16
[58] Field of Search .................. 342/25, 52–55, 342/63, 64, 66, 159, 189, 190–193, 195; 244/3.16, 3.17, 3.19; 364/713, 516; 382/1, 17; 356/51, 319, 320, 419; 250/203.1, 203.6, 206.1, 332, 334, 338.1, 339, 342

[56] References Cited

U.S. PATENT DOCUMENTS

| | | | |
|---|---|---|---|
| 3,174,045 | 3/1965 | Whitney et al. | 250/208.2 |
| 3,703,133 | 11/1972 | Yost, Jr. | 356/51 |
| 3,822,098 | 7/1974 | Rudder et al. | 356/320 |
| 3,829,218 | 8/1974 | Alyanak | 356/300 |
| 3,860,344 | 1/1975 | Garfunkel | 356/51 |
| 3,864,513 | 2/1975 | Halajian et al. | 348/147 |
| 3,882,482 | 5/1975 | Green et al. | 341/9 |
| 3,950,635 | 4/1976 | Constant | 364/724.11 |
| 3,984,671 | 10/1976 | Fletcher et al. | 364/713 |
| 3,992,110 | 11/1976 | Frazer et al. | 356/419 |
| 4,029,963 | 6/1977 | Alvarez et al. | 378/5 |
| 4,048,500 | 9/1977 | Moore | 250/350 |
| 4,084,906 | 4/1978 | Bibbero | 356/326 |
| 4,095,900 | 6/1978 | Murphy et al. | 356/346 |
| 4,128,337 | 12/1978 | Zehnpfennig | 356/346 |
| 4,141,072 | 2/1979 | Perreault | 364/553 |
| 4,167,729 | 9/1979 | Christenson et al. | 382/1 |
| 4,169,245 | 9/1979 | Crom et al. | 455/132 |
| 4,345,840 | 8/1982 | Goetz et al. | 356/407 |
| 4,397,558 | 8/1983 | Hill et al. | 356/354 |
| 4,409,475 | 10/1983 | Zehnpfennig | 250/224 |
| 4,421,981 | 12/1983 | Hough | 250/253 |
| 4,423,325 | 12/1983 | Foss | 250/332 |
| 4,465,940 | 8/1984 | Graff et al. | 348/25 |

(List continued on next page.)

FOREIGN PATENT DOCUMENTS 9205502  4/1992  WIPO.

OTHER PUBLICATIONS

Stotts et al., *Proceedings of the SPIE*, vol. 1305, Signal and Data Processing of Small Targets, 1 Dec. 1990, SPIE Communication of L. Stotts et al: Clutter Rejection Using Multi–Spectral Processing pp. 2–7.

Beer et al, "Analysis of Spectra Using Correlation Functions", Applied Optics, vol. 27, No. 7, 1 Apr. 1988, pp. 1255–1261.

Rauch et al, vol. 20, No. 1, "Background suppression and tracking with a staring mosaic sensor", Optical Engineering, p. 107, p. 1081 Jan. 1981, pp. 103–110.

Sterns et al., "Airborne infrared observations and analyses of a large forest fire", Applied Optics, 1 Aug. 1986, pp. 2554–2562.

U.S. Serial No. 991,772 filed Dec. 17, 1992, entitled "Missle Surveillance Method and Apparatus" by Denney et al., Now U.S. Patent 5300780.

Skolnik, Merrill; *Radar Handbook*, Chapter 15, "Automatic–detection Theory", pp. 15–2 to 15–41, 1970.

Chapter 11, Detectors, from *Infrared Handbook*. ERIM, pp. 11–1 to 11–104, 1989.

Kidd, Col. John "Defense Support Program: Support to a Changing World", AIAA Space Programs and Technologies Conference, 20 pages, Mar. 24–27, 1992; Huntsville, Ala.

*Primary Examiner*—Bernarr E. Gregory

[57] ABSTRACT

A method and apparatus for separating or extracting a desired multispectral optical signal of interest from a background. Radiation is detected from a scene which includes the multispectral optical signal of interest and the background. A multiplicity of wavelength bands are selected from the detected radiation to generate a multispectral input spectrum. The multispectral input spectrum is processed to separate the multispectral optical signal of interest from the background.

23 Claims, 6 Drawing Sheets

U.S. PATENT DOCUMENTS

| | | | |
|---|---|---|---|
| 4,490,613 | 12/1984 | Brame | 250/341 |
| 4,532,639 | 7/1985 | Price et al. | 375/96 |
| 4,560,275 | 12/1985 | Goetz | 356/326 |
| 4,596,930 | 6/1986 | Steil et al. | 250/332 |
| 4,603,331 | 7/1986 | Wehner | 342/192 |
| 4,660,151 | 4/1987 | Chipman et al. | 364/498 |
| 4,678,911 | 7/1987 | Sundberg et al. | 250/253 |
| 4,683,496 | 7/1987 | Tom | 348/625 |
| 4,731,663 | 3/1988 | Kovalchick et al. | 348/93 |
| 4,731,859 | 3/1988 | Holter et al. | 382/36 |
| 4,737,642 | 4/1988 | Steil et al. | 250/332 |
| 4,743,112 | 5/1988 | Burke | 356/326 |
| 4,810,884 | 3/1989 | Carlson | 250/338.5 |
| 4,864,127 | 9/1989 | Brame | 250/253 |
| 4,866,454 | 9/1989 | Droessler et al. | 342/53 X |
| 4,873,632 | 10/1989 | Logan et al. | 364/413.13 |
| 4,908,763 | 3/1990 | Sundberg | 364/420 |
| 4,914,719 | 4/1990 | Conlon et al. | 250/339.13 |
| 4,972,193 | 11/1990 | Rice | 342/192 X |
| 4,996,599 | 2/1991 | Anderson | 348/733 |
| 5,090,807 | 2/1992 | Tai | 356/310 |
| 5,300,780 | 4/1994 | Dewney et al. | 250/342 |

MULTISPECTRAL SIGNATURE EXTRACTION TECHNIQUE

FIELD OF THE INVENTION

The present invention relates to a method and an apparatus for detecting electro-optical signals and more particularly, to a method and an apparatus for extracting a multispectral electro-optical signal of interest from a cluttered background.

BACKGROUND OF THE INVENTION

Figure 1A:
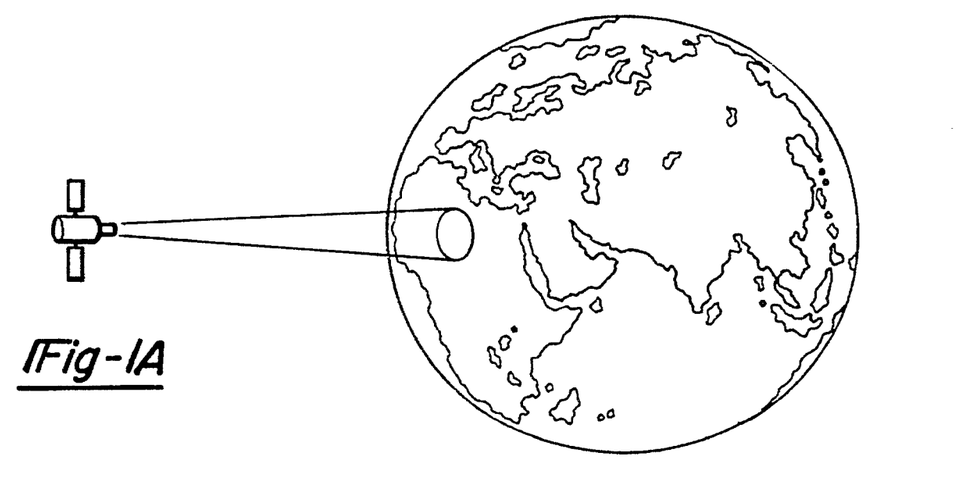
Figures 1B, 1C:
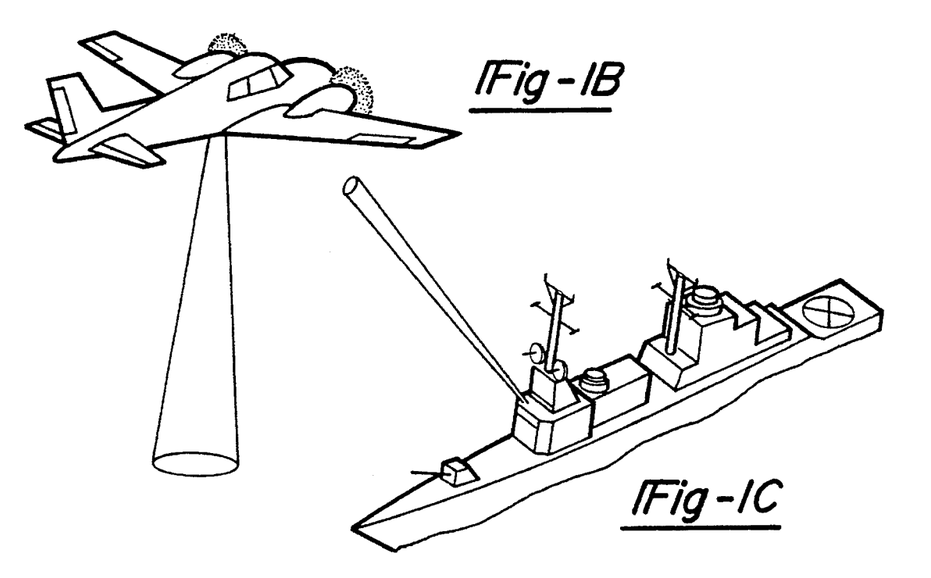
Figure 1D:
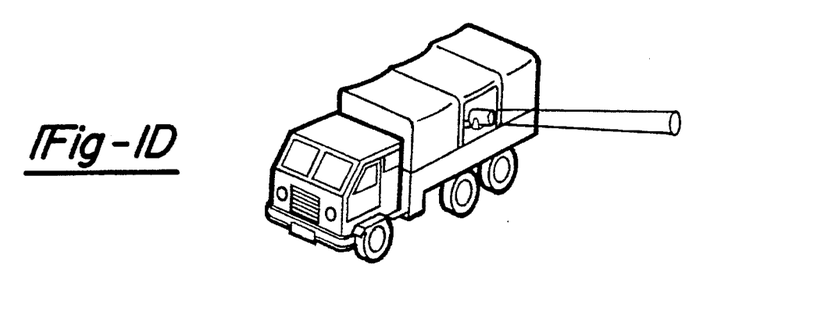

Remote sensing of visual, ultraviolet, and infrared sources currently employ electro-optical detection systems. As illustrated in FIG. 1, the detection systems are mounted on platforms supported by satellites 1, airplanes 3, ships 5 or land based vehicles 7, (FIGS. 1a, 1b, 1c and 1d, respectively). The detection systems include an electro-optical or optical sensor, typically a telescope, for collecting photons representative of a target and a detector for converting these collected photons into electrons and hence an electronic current. This enables information to be gathered about the target.

A prior electro-optical remote detection system for intelligence gathering applications which senses infrared radiation from a target is disclosed, for example, in a paper entitled "Defense Support Program: Support to a Changing World" by Kidd et al, given at the AIAA Space Programs and Technologies Conference, May 24–27, 1992 and the Infrared Handbook, published by ERIM for the U.S. Navy, 1989. Generally such systems seek a target signal in the presence of an overwhelming background signal. For example, these systems attempt to detect a missile from a down looking satellite against an earth background using a satellite sensor which covers a single band for scanning the exhaust signature of the missile. Such a single band detection system is described with reference to FIG. 2 which shows plots of relative signal power or intensity versus wavelength for a background signal 10 and a composite signal 11 of background and target. The background signal is almost always present in the band of interest. Typically, the background signal has undesirable "clutter" interference due, for example, to contiguous areas of high contrast. Severe detection problems often occur when, for example, the satellite scans a target having a sunlit earth behind it due to "glint" reflections of sunlight.

Figure 2:
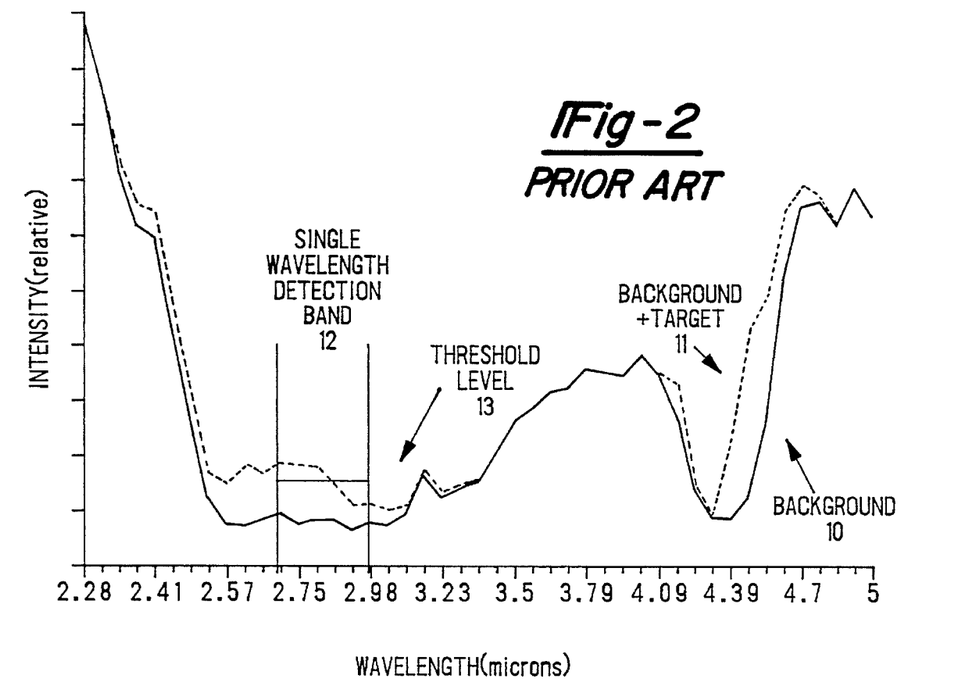
FIG. 2 is a graphical representation for a prior art electro-optical detection system employing a single detection band.

In FIG. 2, the background signal 10 closely approximates the composite signal 11 over the infrared (IR) spectrum between 2.0 and 5.0 micrometers, with the largest variation occurring between about 2.6 and 3.2 micrometers. Another significant difference exists between about 4.1 and 4.8 micrometers. The detection band 12 having a range of about 2.7 micrometers to 3.0 micrometers (see, e.g., page 2–76 of the Infrared Handbook) is typically chosen by the detection system for target recognition or extraction from the background. This corresponds to the water band exhaust signature which is prominent in a missile.

Conventional detection occurs when the intensity of the composite signal containing the missile exhaust within the band 12 exceeds the threshold 13. The limitation in this approach is that the detected intensity of the composite signal 11 must be perceptibly larger than the background 10 within the detection band or false alarms will occur as a result of background variances. Texts in this field (see, e.g., Chapter 15 of *Radar Handbook*, M. Skolnik editor, 1970) have recognized the problem with false alarms in previous approaches. One attempt to solve the problem involves raising the threshold level 13 of the detector so that false detection of a target would occur infrequently. However, as shown, the composite signal 11 contains actual, but weak, target signals which are less than the threshold 13 over a portion of the detection band 12. Therefore, if the threshold level 13 is raised too high, many actual targets would remain undetected.

In another prior art approach, as used in the Defense Support Program (DSP), two discrete radiometers are used to cover two detection bands which are independently processed. However, such approaches can be defeated by a strong background signal that approximates or exceeds the target within its two relatively narrow detection bands. Hence it is also subject to a large number of false alarm indications when the detection threshold level is too close to the background clutter or to undesirably lower detection rates when the threshold is raised too high.

SUMMARY OF THE INVENTION

In accordance with the present invention a method and apparatus are disclosed for extracting a multispectral signal of interest from a cluttered background. A multispectral spectrum of the background and of the signal of interest are obtained and serve as an input spectrum. Provision is made for separating the multispectral signal of interest from background by substantially exclusively processing the input spectrum.

An advantage of the present invention is that it provides a low false alarm rare. This results since the net signal to noise ratio is enhanced because a higher level of signal is extracted while the clutter in the background is diminished. Consequently, powerful potentially interfering false targets, such as sunlight, can be detected and eliminated.

Another advantage is that the present invention exhibits high sensitivity. By incorporating the entire spectrum of interest, much fainter targets can be detected.

It will be appreciated from the foregoing that the present invention represents a significant advance in the field of electro-optical detection systems. In particular, the invention successfully addresses a number of problems that have long been posed for designers of electro-optical detectors. First, the use of a large number of spectral bands allows the difference between the radiation intensity of the target of interest and the cluttered background to provide information for detecting the target of interest. Moreover, more than one target of interest can substantially simultaneously be detected from the same input spectra. Also, detection is not limited to situations where the intensity of the target is perceptively greater than that of the background in a predetermined narrow detection band.

Other features and advantages oft he present invention will become apparent from the following detailed description, taken in conjunction with the accompanying drawings, which illustrate, by way of example, the principles of the invention.

BRIEF DESCRIPTION OF THE DRAWINGS

FIGS. 1(a–d) are pictorial representations of electro-optical detection systems illustrating four types of remote sensor platforms;

FIGS. 5(a–b) are schematic block diagrams of one embodiment of the electro-optical detection system of the present invention used to detect targets of acetone and methane gases.

DETAILED DESCRIPTION

Figure 3:
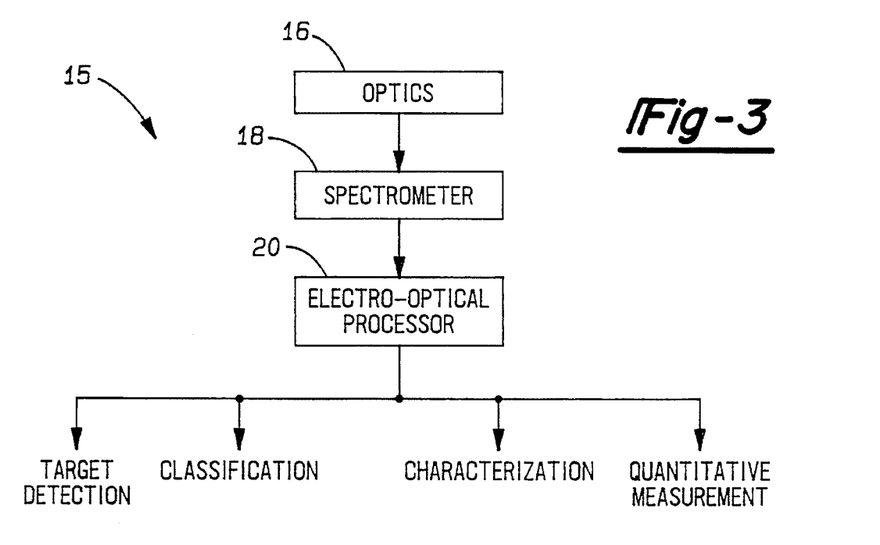
FIG. 3 is a block diagram of the electro-optical detection system made in accordance with the teachings of the present invention.

Referring now to FIG. 3, a block diagram of the electro-optical detection system 15 of the present invention is illustrated. System 15 includes an optical sensor 16, a spectrometer 18 and an electro-optical processor 20. The sensor 16 serves to collect photons from the target of interest. In the preferred embodiment, the sensor 16 includes a telescope.

The spectrometer 18 resolves the optical spectrum from optics 16 into a multispectral input spectrum. For purposes of this invention, a multispectral spectrum means a signal having a plurality of bands of radiation. A band is a continuum of wavelengths between two limits. Furthermore, as used in connection with this invention, the term electro-optical signal means radiation having a wavelength between about 0.2 microns and 30 microns. Where it is desired to detect a missile which is launched from the earth, the optics 16 generally cover the near infrared range of about 2.0 microns to 5.5 microns.

Figure 3A:
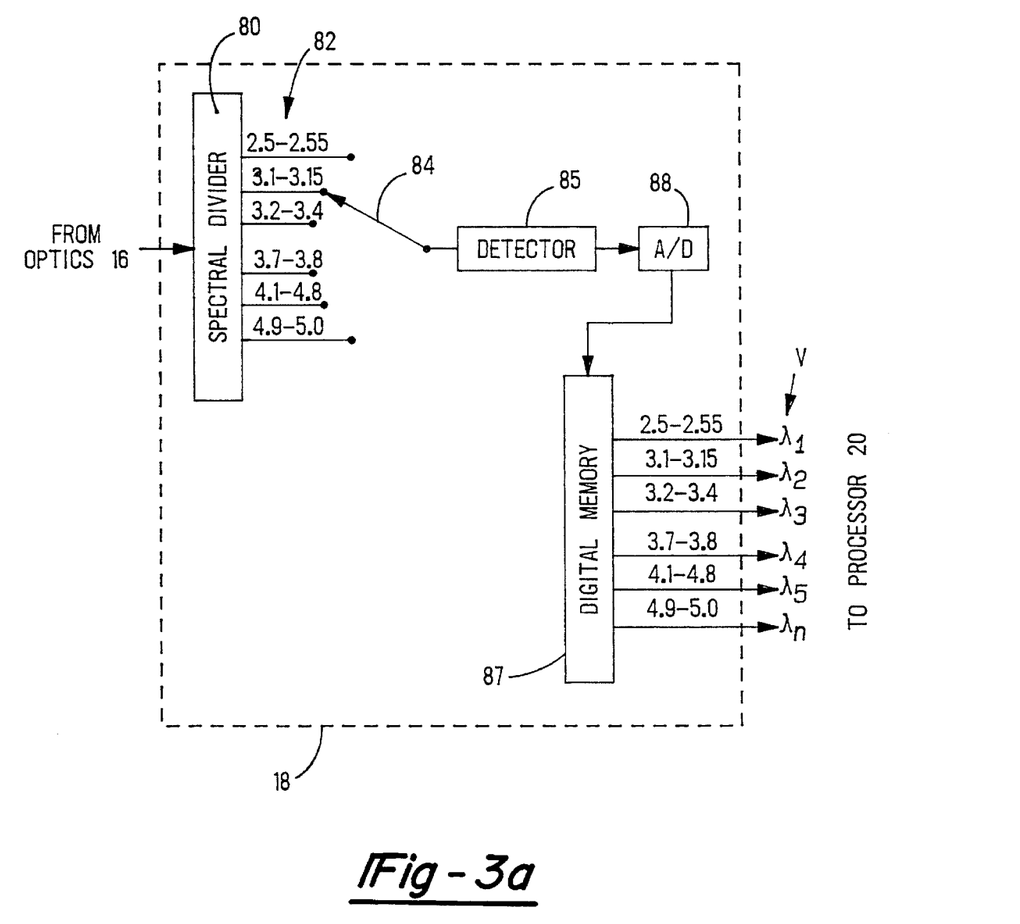
FIG. 3(a) is a schematic diagram of one spectrometer embodiment for use with this invention.

FIG. 3(a) generally illustrates the operation carried out by spectrometer 18. The optical spectrum from optics 16 is fed to a spectral divider 80 which separates the optical spectrum into a different wavelength bands represented by lines 82. The function of spectral divider 80 can be accomplished in many ways including the use of color filter wheels or Fourier transform type spectrometers which can be functionally achieved by a Michelson-type interferometer. Alternatively, this function can be performed by an assembly of dichroic beamsplitters or a dispersive arrangement employing a prism or a grating.

A selector 84 is employed, in the preferred embodiment, to serially connect the collected photons in each selected band to a detector 85 which converts the photons into analog electrical signals. Analog-to-digital converter 88 converts the analog signal into proportional digital values which are temporarily stored in memory 87. When values for all of the selected bands are stored, memory 87 can be suitably addressed to read out the band values, in parallel, for further processing. The plurality of the selected and thus created band values form the multispectral input spectrum V which is applied to processor 20.

The bands are preferably chosen by using knowledge of the spectral shapes of the background and target signatures to identify wavelengths which, when taken in combination, improve the multispectral separation of the target(s) from the background, and from each other by providing uniquely different multispectral signals. It should be understood that various different methods can be used for choosing the bands that will comprise the multispectral input spectrum for processing. A minimum of two bands are selected, but more preferably, about six to seven bands or even up to a dozen or more bands may be used depending upon the application.

Processor 20 operates on the multispectral input spectrum substantially exclusively to separate the signal of interest from the background, both of which are contained in the input spectrum V initially. While it is envisioned that several types of processor architectures can be utilized for carrying out the teachings of this invention, it will be described in FIG. 4 in connection with an infinite impulse response processor. For purposes of this invention, an "infinite impulse response processor" means a processor using negative feedback so as to be recursive in operation where the processor affects its next solution in an iterative manner.

As will be described in more detail subsequently, the processor extracts or separates one or more multispectral targets from the input spectra V. The processor includes N parallel channels each comprising a matched filter using a spectral template. N-1 channels include a known spectral template of a respective one of the N-1 targets and the Nth channel includes a known spectral template of the background. In other embodiments, there can be multiple channels of background. The N-1 channels operate on their respective targets of interest and the Nth channel operates on the background. The processor combines and recursively cancels the operated signals and develops a residue spectrum R of unmatched signal, if any, from the input spectrum of the scene.

This residue spectrum is a measure of the fit of the targets to the matched filters or templates of the targets of interest. The difference between the residue spectrum and the matched filter spectrums is a measure of the accuracy of the classification of the targets to the expected target signatures. Characterization of targets is also accomplished. By using matched filters of different targets of interest and with variations of such matched filters, target characters can be uncovered and discriminated. The processor provides a measure of the quantification of the target. By measuring the magnitude of the signature of the target in a known quantity, the matched filter can be quantified. Measurement of the optical quantum efficiency of the system, noise, and other uncertainties provide a measure of the signal uncertainty and signal intensity. Including these with the signal measurement intensity provide a quantitative measurement of the target substance column density. From the above, the processor is illustrated in FIG. 3 as having outputs depicted as object or target detection, classification, characterization and quantitative measurement.

Figure 4:
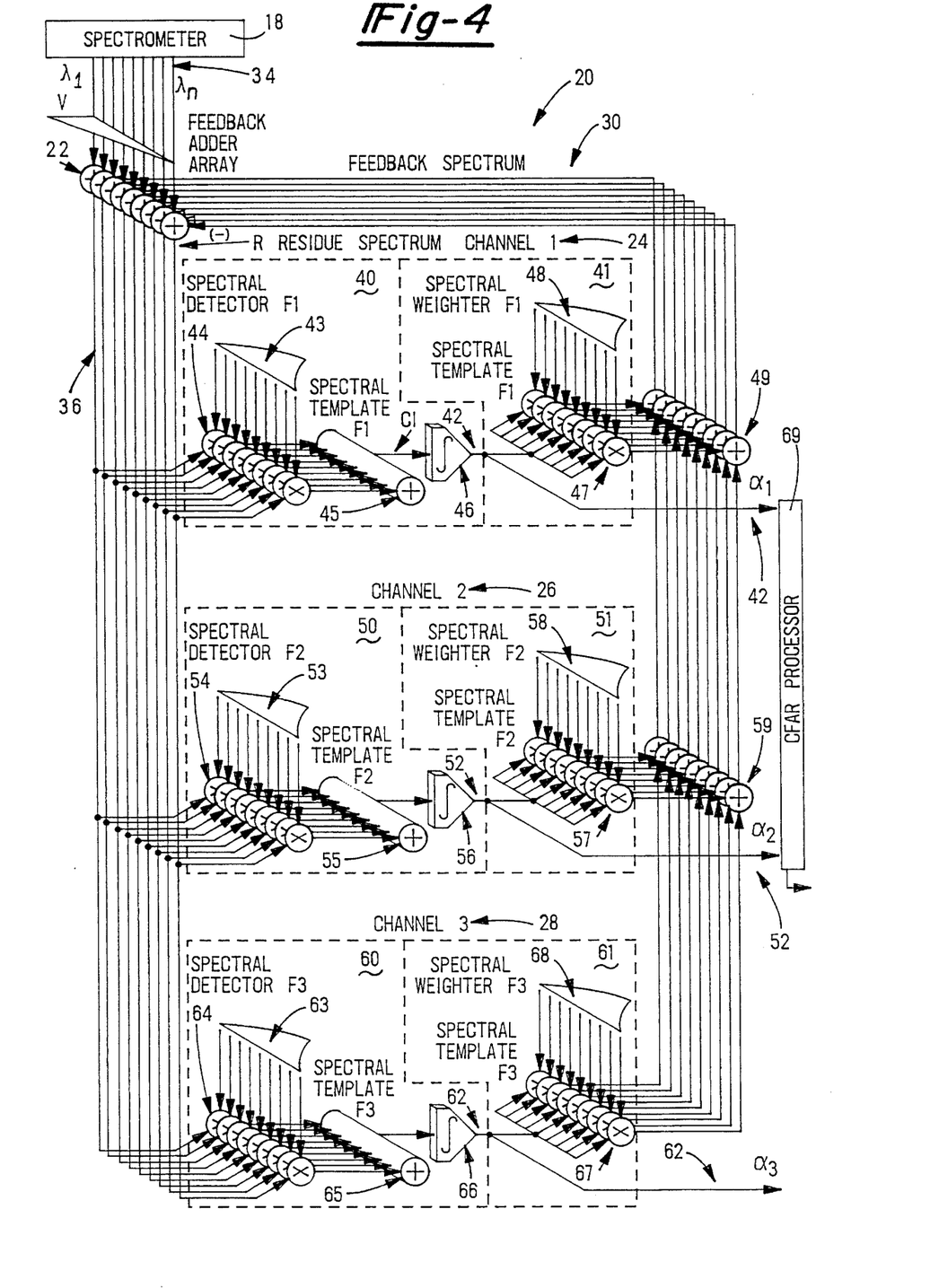
FIG. 4 is a schematic diagram of the electro-optical detection system of the preferred embodiment of the present invention.

In FIG. 4, a schematic diagram of the electro-optical processor 20 having an infinite impulse response (IIR) architecture is illustrated. The electro-optical processor 20 includes an input 22, a first channel 24, a second channel 26, a third channel 28 and a feedback path 30.

As previously discussed, the optical sensor 16 provides an optical signal representative of the scene of interest to the spectrometer 18. The spectrometer 18 resolves the optical signal into the multispectral input spectrum V. Mathematically, it is treated as a vector. The spectrometer 18 provides this multispectral spectrum V to input 22 via conductors 34.

The input 22 is a feedback adder array and serves to combine the bands of the feedback spectrum in the feedback path 30 in a negative feedback manner (illustrated by the negative sign within parenthesis in FIG. 4) with the corresponding bands of the spectrum V on conductors 24 on a band by band basis to provide a residue spectrum R on conductors 36.

The first channel 24 includes a spectral detector F1, also designated by the numeral 40, and a spectral weighter F1, also designated by the numeral 41. Channel 24 serves as a matched spectral filter. Briefly, the spectral detector F1 operates initially on the input spectrum and then on the residue spectrum R and correlates and integrates its spectral components or bands with those supplied internally to it by a spectral template 43. Spectral detector 40 provides an output on line 42 that is the weighting coefficient α1, for the template 43. The output α1 is a scalar signal whose magnitude is in proportion to the degree of correlation between the spectral template 43 and the spectrum fed to it. In other words, α1 provides an indication as to whether the target is contained in the input spectrum. The polarity of coefficient α1 indicates whether an emissive or absorbance spectrum is being analyzed.

With more particularity, the spectral detector 40 comprises a spectral template 43, an array of multipliers 44, an adder 45, and an integrator 46. The spectral template 43 is a data base describing the multispectral output or signature of the multispectral signal of interest in the bands of input spectrum V. Such a template, also known as a reference or source signature or source profile, is obtained previously by measuring the emission in the electromagnetic spectrum from a known target of interest. A priori knowledge of the target is assumed.

The spectral template can also be obtained from experimental data or calculated from formulas derived from theoretical models representing the radiation from different targets of interest. Spectral templates can be constructed for organic and inorganic molecules, missile exhausts or plumes. The spectral template is unitless and as will be described, has the same shape as the spectrum to be identified. It has the identical number of bands as are contained in the input spectrum V.

The multipliers 44 serve to multiply each spectral band of the residue spectrum R by the corresponding band of the spectral template 43. The product formed by vector multiplication is then added by adder 45. The resulting sum forms the correlation integral (CI) of the two vectors and has a peak response when the two vectors are identical. Integrator 46 integrates the correlation integral and provides on line 42 the weighting coefficient α1, representing the magnitude of the correlation over time. As previously mentioned, the signal is a scalar and is bipolar.

The correlation integral (CI) is the degree of likeness between the spectral template and the residue spectrum. When the value of the integral is 0, then there is no correlation or degree of likeness. When the value is positive, then there is some likeness. When the value is negative, the recognition is inverted. Accordingly, it should be recognized that when a signal of zero magnitude is applied to the integrator 46, the integrator stops integrating. When a positive signal is applied, the integrator begins to increase indefinitely and when a negative signal is applied, the integrator provides an output that decreases indefinitely. In other words, the integrator 46 accumulates any correlation between the spectral template 43 and the residue spectrum 36 and produces a single scalar weighting coefficient, α1. This represents the estimate of the magnitude of the matching of the target in spectrum 34 with spectral template 43. When α1 is zero, there is no component of the target signal present.

The spectral weighter 41 includes an array of multipliers 47 and a spectral template 48. The spectral template 48 is identical to the spectral template 43. The multipliers 47 multiply each band of the spectral template 48 by the weighting coefficient, α1. When summed by an array of adders 49 the weighted spectral template signal has been adjusted to attempt to equal its corresponding target component in the input spectrum V. The spectral weighter 41 generates the spectral template of interest F1 with a magnitude α1 as provided by the spectral detector 40. The integrator's output 42 from the spectral detector represents the current estimate of the spectral template's magnitude. When the value α1 is employed to adjust the feedback component for its spectral template, the integrator will servo to the value which cancels any power in the residue spectrum R that correlates with the respective channel templates.

This invention also allows for spectral template 43 to be modified to incorporate only values for F1 that are uniquely different than F2 and F3. In this case, the same knowledge used in selecting bands is used to modify template 43. Similar logic applies to the remainder of the other channels.

Channels 26 and 28 are matched filter channels similar to the channel 24 and comprise components that are identical in construction to like components in the channel 24 described above. Accordingly, there has been applied to each component in the channel 26 a reference numeral in the 50–59 series corresponding to the reference numeral in the 40–49 series that was applied to the like component of the channel 24, and there has been applied to like components of the channel 28 a reference numeral in the 60–69 series.

To describe the operation, assume that it is desired to detect two different electro-optical targets within the spectrum that includes the composite background and target signals. Channel 1 is a matched filter for processing one of the expected targets, channel 2 is a matched filter for processing the other expected target and channel 3 is a matched filter for processing the known background. Consequently, the spectral templates 43 and 48 are identical and constructed from the known signature of the first target of interest. The spectral templates 53 and 58 are identical and constructed from the known signature of the second target of interest. The spectral templates 63 and 68 are identical and measured beforehand from the background of the scene without any targets present. The scene is scanned by the optics 16, which collects photons and transmits them to the spectrometer 18. In this discussion, it is assumed that two targets being sought were present during the scan. Hence the spectrometer 18 produces a multispectral signal input spectrum V that includes the two targets and the background present during the scan.

The bands of the spectrum V are applied to the input 22 and through the conductors 36 simultaneously to the array of the multipliers, 44, 54, and 64 of the spectral detectors 40, 50 and 60, respectively. The multipliers multiply each spectral band of the spectrum V by the corresponding band of the spectral template. The products formed by the vector multiplication are then added by the adders 45, 55 and 65 so as to produce the respective correlation integrals of the targets and background. Integrators 46, 56 and 66 integrate the correlation integrals to produce the scalar weighting coefficients α1, α2 and α3 on outputs 42, 52 and 62, respectively. This represents the magnitude of the spectral templates' correlation with the input spectrum V. To adjust this correlation, the weighting coefficients are respectively applied to the multiplier arrays 47, 57 and 67 of the spectral weighters 41, 51 and 61. The multipliers multiply each band of their associated spectral templates 48, 58 and 68 by the scalar weights α1, α2 and α3, respectively, to attempt to recreate the multispectral signal interest in each channel that is found in the input spectrum V.

Adder array 59 adds the vectors so developed by spectral weighters 51 and 61 and adder array 49 adds the resultant vector with the vector from spectral weighter 41 to provide the feedback spectrum in the feedback path 30. This negative feedback is combined substantially simultaneously on a band by band basis with the input spectrum at the input array 22 to recursively cancel the input spectrum V and produce the residue spectrum R. The feedback spectrum converges to match the spectrum V and thereby cancel the input spectrum if the targets are present. The cancellation is not initially exact and the resulting residue spectrum is iteratively operated on by the processor 20 to reduce the residue spectrum to a preselected magnitude, such as a least mean square value. Detection of the two targets occur substantially simultaneously when their respective coefficients $\alpha 1$ and $\alpha 2$ increase above a given threshold level. It should be noted that if an expected target was not present, the weighting coefficients $\alpha$ would tend toward zero. This would indicate that none of that target signature component was present in the scene. The outputs $\alpha$ can be used in a variety of manners to indicate the detection of one or more targets. For example, lines 42, 52 are shown in FIG. 4 as being coupled to a known Constant False Alarm Rate device 68 for further analyzing the characteristics of the alarm signals $\alpha$ in a known manner and to generate warning signals for transmission to ground stations when appropriate.

Detection of more than two targets types is done in a similar manner. A matched filter is used for each expected target and its spectral template is stored in a separate channel. For example, when nine different targets are sought, the electro-optical processor wall include ten channels, nine for extracting the nine targets and one for matching the spectrum of the background. Likewise, detection of a target or targets in the presence of multiple background components is done in a similar manner. A matched filter is used for each expected target and background components and their corresponding spectral templates are stored in separate channels. An example of multiple background components would exist for day and night illumination conditions.

The residue spectrum R, or error signal, may also be employed in some detection and quantification applications to improve template selection. A library of pre-recorded spectral signatures may be searched for the best fit to the residue spectrum. Selection of a spectral signature template of another target that is included within the composite signal will reduce the residual spectrum on successive iterations. An additional feature can include a memory which is connected between the spectrometer 18 and the electro-optic processor 20. The memory can serve to store the input spectra and provide it to the electro-optical processor at a later time. Also, preproceesed signals can be stored in the memory for completion at a later time. There is no inherent requirement for simultaneously processing the optically detected signals.

It should be appreciated that the present invention is effectively decomposing or separating the input spectrum V into its constituent multispectral components, i.e. the two targets and the background. The output of channel 1 will be essentially the same as the multispectral signature of the first target, provided that it is present. If there is only a small degree of correlation or matching between the spectral template 43 and the input spectrum, then the weighting coefficient $\alpha_1$ settles to a relatively low level and will not reach its preselected detection threshold value thereby avoiding false alarms. As a result, the multipliers 47 will not need to amplify the spectral template 48 as the output of channel 1 which is used as part of the feedback spectrum. On the other hand, if a preponderance of the bands of the multispectral template are found within the input spectrum, then the weighting coefficient $\alpha_1$ will accumulate thereby amplifying the template 48 as the output of channel 1. This will effectively cancel this component or signature of the first target in the input spectrum, thereby driving the residue spectrum R back toward zero.

The present invention effectively operates even though there may not be much signal discrimination between the background and target signals in any given band. This is because of the multispectral detection approach in which the target and background signatures are made up of a plurality of different bands. Consequently, even though the target and background may be of substantial equal value in one band, the differences over the plurality of bands will enable accurate detection of the target.

Mathematically, the electro-optical signal processing system can be expressed with reference to the infinite impulse response (IIR) solution (as described above) in connection with the following equations 1–7 or as a closed form solution (equations 8–10) which can be solved by a suitably programmed general purpose computer.

With respect to the IIR solution, consider the generalized N-spectrum system where input spectrum V is to be decomposed into N constituent spectrums, $F_1, F_2, \ldots, F_n$. The residue spectrum R can be written as a loop equation as follows:

$$R = V - \alpha_1 F_1 - \alpha_2 F_2 - \ldots - \alpha_n F_n \tag{1}$$

where $\alpha_1 = F_1$ weighting coefficient
$\alpha_2 = F_2$ weighting coefficient
$\vdots$
$\alpha_n = F_n$ weighting coefficient The IIR electro-optic signal processor minimizes the norm of the residue spectrum vector R over all possible weightings of constituent spectra $F_1, F_2, \ldots, F_n$.

Taking the Euclidean norm of the residue, the following is obtained $$R^2 = \left[ V - \sum_{i=1}^{N} \alpha_i F_i \right]^T \left[ V - \sum_{i=1}^{N} \alpha_i F_i \right] \tag{2}$$

$$= V^T V - \sum_{i=1}^{N} \alpha_i F_i^T V - \sum_{i=1}^{N} \alpha_i V^T F_i + \sum_{i=1}^{N} \sum_{j=1}^{N} \alpha_i \alpha_j F_i^T F_j \tag{3}$$

$$= V^T V - 2 \sum_{i=1}^{N} \alpha_i F_i^T V + \sum_{i=1}^{N} \sum_{j=1}^{N} \alpha_i \alpha_j F_i^T F_j \tag{4}$$

where T denotes the vector transpose. Taking the partial derivative with respect to each weighting coefficient, the following is obtained $$\frac{\partial \|R\|^2}{\partial \alpha_i} = -2 F_i^T V + 2 \sum_{\substack{j=1 \\ j \neq i}}^{N} \alpha_j F_i^T F_j + 2 \alpha_i F_i^T F_i. \tag{5}$$

The norm of the residue vector will be at a minimum when all such partial derivatives vanish. Thus, setting equation 5 equal to zero and solving for $\alpha_1$ yields $$2 \alpha_i F_i^T F_i = 2 F_i^T V - 2 \sum_{\substack{j=1 \\ j \neq i}}^{N} \alpha_j F_i^T F_j \tag{6}$$

-continued or $$\alpha_i = \frac{F_i^T V - \sum_{j=1, j\neq i}^{N} \alpha_j F_i^T F_j}{F_i^T F_i} . \quad (7)$$

The closed form solution can be solved using linear algebra techniques or matrix notation expressed as $$Ma=b \quad (8)$$

Where M is an N by N matrix with row i, column j element $$m_{ij} = \frac{F_i^T F_j}{F_i^T F_i} \quad \begin{array}{l} \text{for } i = 1, 2, \ldots, N \\ \text{for } j = 1, 2, \ldots, N \end{array}, \quad (9)$$

and a and b are the N-dimensional vectors $$a = \begin{bmatrix} \alpha_1 \\ \alpha_2 \\ \cdot \\ \cdot \\ \cdot \\ \alpha_N \end{bmatrix} \text{ and } b = \begin{bmatrix} F_1^T V/F_1^T F_1 \\ F_2^T V/F_2^T F_2 \\ \cdot \\ \cdot \\ \cdot \\ F_N^T V/F_N^T F_N \end{bmatrix} . \quad (10)$$

Note that in defining the linear system equation (8) a total of $2N+(N^2-N)/2$ dot products are required. The length (i.e., number of terms) of each of these dot products is the number of bands in each spectrum being analyzed. Once the linear system is defined, it can be solved using conventional Gaussian elimination techniques. The resulting values of the vector "a" represent the weighting coefficients α which minimize the error residue in the least mean squares sense.

Figure 5A:
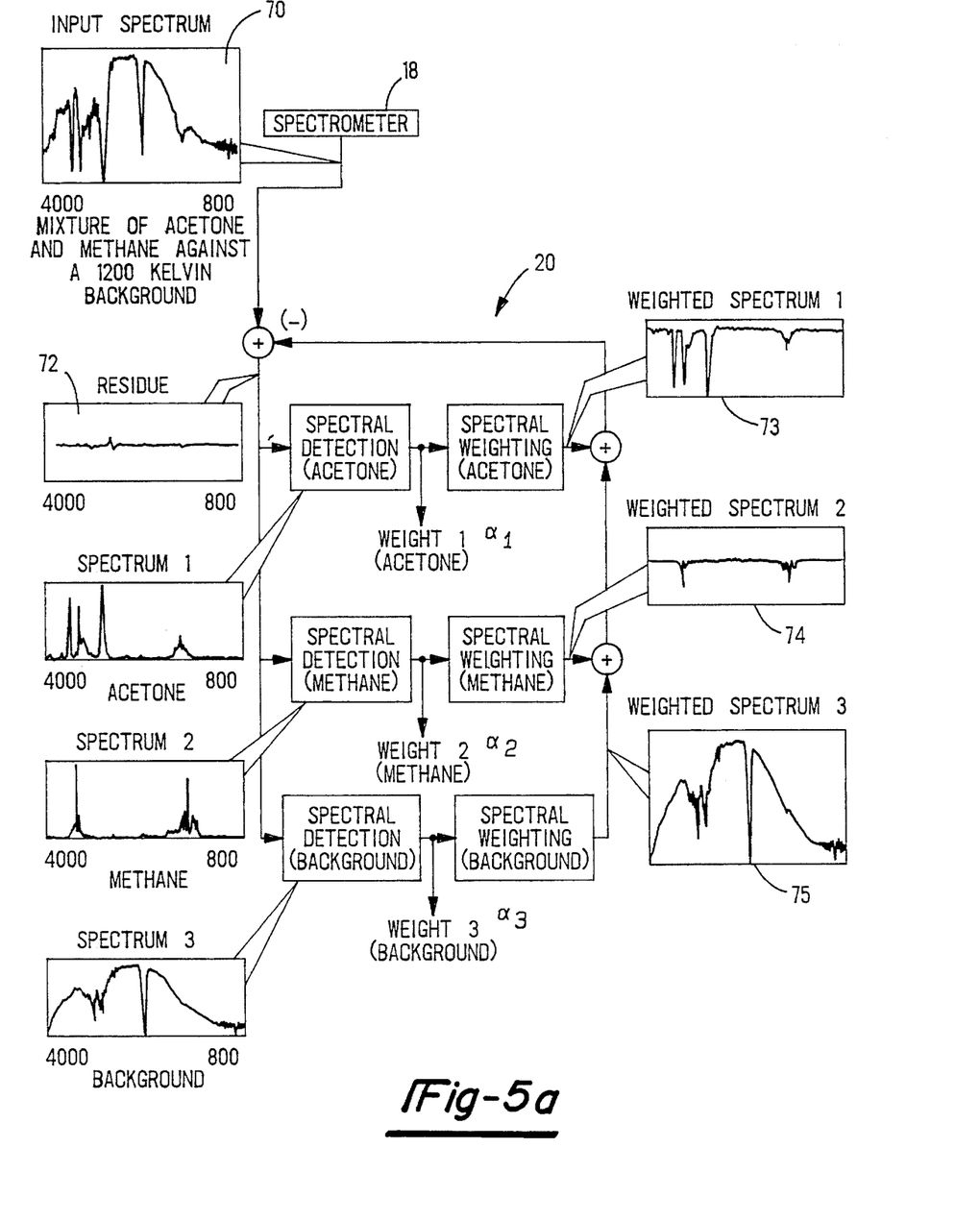
Figure 5B:
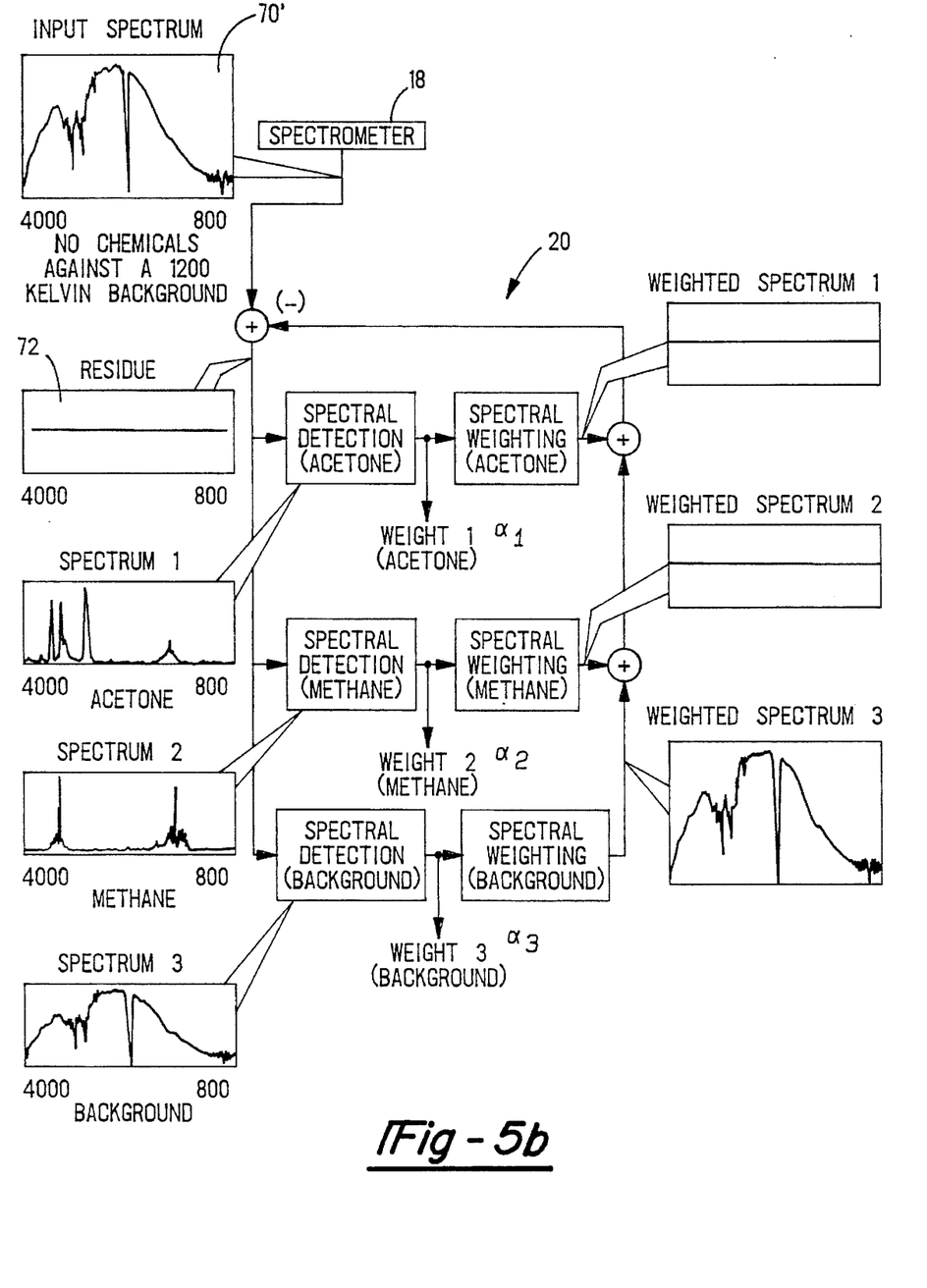

FIG. 5 illustrates the use of the present invention in connection with two particular, non-limiting, examples. In FIG. 5(a) a conventional gas cell comprising an aluminum tube having glass ends was illuminated through one end by a black body emitting at 1200 deg. K. A spectrometer made by Mattson, Model 4020, measured the photons passing through the opposed end. The Model 4020 spectrometer provides a graph of amplitude of photons received plotted against wave number for a wavelength corresponding to one centimeter$^{-1}$ and indicates 3200 discrete points. The plot of the empty cell for wavelengths of 800–4000 cm$^{-1}$ provided the black body wavelength spectrum, representative of the background. Next, the cell was filled with 1 Torr of methane and a measurement of the spectrum characteristic of methane was obtained for wavelengths of 800–4000 cm$^{-1}$ (see FIG. 5b). The methane was removed. Similarly the cell was filled with 1 Torr of acetone and its spectrum was measured. Finally, 1 Torr of methane and 1 Torr of acetone were placed in the cell and the spectrum of the combined unreactive gases was obtained. This represents the composite signal of the two targets of interest and the background.

A Compaq 386 personal computer was programmed with the algorithm set forth in the previously recited mathematical expression, equations 7 and 8. Note that there are two targets of interest, methane and acetone. Hence two spectrum weighting coefficients, $\alpha 1$, and $\alpha 2$, respectively, are to be determined. Also, the background spectrum weighing coefficient is $\alpha 3$. From equation 8, the number of dot products are 9, e.g. N=3 and $2(3)+(3^2-8)=9$.

FIG. 5 illustrates the process somewhat pictorially. Spectrum 1 represents an emissive spectrum of acetone and is used as a template F1 in channel 1. Spectrum 2 is an emissive methane spectrum and is used as the template F2 in channel 2. Spectrum 3 represents an emissive background template for the background spectrum. The input spectrum 70 contains a combination of emissive and absorbance multispectral characteristics. The background component of the input spectrum is emissive whereas the acetone and methane components of the input spectrum are absorbent. Since the template F1 in channel 1 is emissive, the weighting coefficient α1 will be negative in polarity. The coefficient α1 will also exceed the threshold level because of the high degree of correlation between the bands in the template F1 and the residue spectrum R which is fed back to the input. Box 73 represents the multispectral output of channel i which is inverted due to the negative polarity of the weighting coefficient α1. A comparison of the output spectrum 73 with spectrum 1 shows a high degree of correlation thereby indicating, pictorially, that acetone was present in the input spectrum. Channel 2 operates in a similar manner for methane. The weighting coefficient α2 is inverted and exceeds the threshold level indicating a high degree of correlation with the methane template. The output of the channel 2, at box 74, substantially corresponds with the template F2, albeit inverted. The channel 3 output 75, however, ie not inverted because an emissive background template (spectrum 3) is used and the input spectrum 70 contains emissive spectral characteristics of the background, unlike the methane end acetone.

FIG. 5(b) illustrates an example where the input spectrum 70' does not contain methane or acetone. Note that the resulting channel 1 and 2 outputs illustrated in boxes 73' and 74' are driven to zero because α1 and α2 are near zero since there was little correlation detected.

It will be appreciated that the present invention has the ability to detect objects characterized as having emission, e.g., missiles and hot gases or absorption, e.g. chemicals and gases, and phosphorescence. Moreover, although described in spectra and wavelengths, it is obvious to those skilled in the art that the present invention can be applied to temporal or frequency domains.

It also will be appreciated that, although a single embodiment of the invention has been described In detail for purposes of illustration, various modifications may be made without departing from the spirit and scope of the invention. Accordingly, the invention is not to be limited except as by the appended claims.

What is claimed is:

1. A method of extracting a desired multispectral optical signal of interest from a background comprising the steps of:

a) detecting multispectral optical radiation from a scene which includes the signal of interest and the background;

b) selecting a multiplicity of wavelength bands from the detected radiation to generate a multispectral input spectrum; and c) processing the selected bands of the input spectrum to decompose the input spectrum into separate multispectral signals representing the background and the signal of interest if present within the input spectrum.

2. The method of claim 1 which further comprises:

generating a multispectral template from known information about the signal of interests;

generating a second multispectral template from known information about the background; and using the multispectral templates to determine the degree of correlation of multispectral signals in the templates and in the input spectrum.

3. The method of claim 2 which further comprises:

correlating corresponding bands of the spectral template for the signal of interest and the input spectrum to generate a correlation signal representative of the degree of correlation therebetween;

using the correlation signal to generate a weighted multispectral signal;

similarly generating a weighted multispectral signal for the background;

summing the weighted multispectral signals to generate a feedback spectrum;

subtracting the feedback spectrum from the input spectrum on a substantially simultaneous band-by-band basis to generate a residue spectrum; and using the correlation signal to determine whether the multispectral signal of interest was present in the input spectrum.

4. The method of claim 3 wherein the input spectrum contains wavelengths of between about 2.0 and 5.5 microns.

5. The method of claim 4 wherein the input spectrum is derived from an optical sensor mounted to a satellite and providing an image of the earth's surface and a target of interest.

6. The method set forth in claim 2 which further comprises:

generating a third multispectral template from known information about a second signal of interest; and simultaneously processing the multispectral input spectrum with the third multispectral template to separate the second signal of interest from the background.

7. The method of claim 6 which further comprises:

correlating corresponding bands of the second spectral template and the input spectrum to generate a second correlation signal representative of the degree of correlation therebetween;

using the second correlation signal to generate a weighted multispectral signal; and summing the second weighted multispectral signal with the other weighted multispectral signals to generate said feedback spectrum.

8. The method of claim 1 wherein step c) is performed by an infinite impulse response processor.

9. The method set forth in claim 8 wherein said processor includes an input, a first channel having a known spectral template of the background, a second channel having a known spectral template of the target, and a feedback path connecting said first and second channels to said input, wherein said multispectral electro-optical input spectrum is provided to said input, and wherein the processing step b) includes:

1) applying said input spectrum to said first channel for operating on said background;

2) applying said input spectrum to said second channel for operating on a known signature of the target; and 3) summing said operated background and target signals in a manner to approximate said multispectral electro-optical input spectrum.

10. The method set forth in claim 9 wherein step 1) includes the steps of correlating said spectral template of the background with the input spectrum and generating a weighted background spectral signal output, and wherein step 2) includes the step of correlating said spectral template of said target with the input spectrum, and generating a weighted target spectral signal output.

11. The method set forth in claim 10 and further comprising the steps of summing said weighted background and target spectral signals, and applying said summed weighted templates through said feedback path to said input.

12. The method set forth in claim 11 wherein the background correlating steps include the steps of multiplying corresponding bands of said spectral template of the background and said input spectrum to provide a multiplied background signal, summing the products of said multiplied background signal together and integrating the sum to provide a first correlation integral output and applying said first correlation integral output to a second spectral template of the background; and wherein the target correlating steps include the steps of multiplying corresponding bands of said spectral template of said target with said input spectrum to provide a multiplied target signal, summing the products of said multiplied target signal together to provide a second correlation integral output, and applying said second correlation integral output to a second spectral template of said target.

13. The method of claim 1 which further comprises:

generating weighting coefficients $\alpha 1, \alpha 2 \ldots \alpha N$, respectively, for a plurality of spectral templates of signals of interest and background, $F_1, F_2 \ldots F_N$ by solving the following equations:

Expressing in matrix notation the formula:

$$Ma=b \qquad (8)$$

where M is an N by N matrix with row i, column j element $$m_{ij} = \frac{F_i^T F_j}{F_i^T F_i} \qquad \begin{array}{l} \text{for } i = 1, 2, \ldots, N \\ \text{for } j = 1, 2, \ldots, N \end{array} \qquad (9)$$

and a and b are the N-dimensional vectors $$a = \begin{bmatrix} \alpha_1 \\ \alpha_2 \\ \cdot \\ \cdot \\ \cdot \\ \alpha_N \end{bmatrix} \quad \text{and} \quad b = \begin{bmatrix} F_1^T V/F_1^T F_1 \\ F_2^T V/F_2^T F_2 \\ \cdot \\ \cdot \\ \cdot \\ F_N^T V/F_N^T F_N \end{bmatrix} . \qquad (10)$$

14. Apparatus for extracting a desired multispectral optical signal of interest from a background, said apparatus comprising:

detecting means for detecting multispectral optical radiation, in the 0.2–30 micron wavelength range, from a scene which includes the signal of interest and the background;

means for selecting a plurality of wavelength bands from the detected radiation to generate a multispectral input spectrum; and processing means for processing the multispectral input spectrum to separate the signal of interest from the background.

15. The apparatus of claim 14 which further comprises:

first storage means for storing a multispectral template from known information about the signal of interest;

second storage means for storing a second multispectral template from known information about the background;

means for correlating the first spectral template for the signal of interest with the input spectrum to generate a correlation signal representative of the degree of correlation therebetween;

means for correlating the second spectral template for the background with the input spectrum to generate a second correlation signal representative of the degree of correlation therebetween; and using at least the first correlation signal to provide an indication that the signal of interest is present within the input spectrum.

16. An apparatus for separating a multispectral optical target from a background comprising:

an input for receiving a multispectral input spectrum containing both target and background information;

a first channel means, coupled to the input, for separating said background from the multispectral input spectrum;

a second channel means, coupled to the input, for separating said target from the multispectral input spectrum;

said first and second channel means operating on the multispectral input spectrum to respectively generate outputs which are functions of the degree of correlation between the presence of background and target multispectral signatures in the spectrum; and a feedback path interconnecting outputs of said first and second channels to said input.

17. The apparatus as set forth in claim 16 which further comprises means for combining outputs of the first and second channels, and said feedback path recursively applying the combined channel outputs to the input spectrum to generate a residue spectrum.

18. The apparatus as set forth in claim 17 wherein said first channel includes a spectral template of said background, first means responsive to said spectral template of said background and the input spectrum to generate a first correlation signal and means responsive to said first correlation signal for providing a weighted background output to said feedback path; and wherein said second channel includes a spectral template of said target, second means responsive to said spectral template of said target and the input spectrum to generate a second correlation target signal and means responsive to said second correlation target signal for providing a weighted target output to said feedback path.

19. The apparatus as set forth in claim 18 and further comprising means for summing said weighted target output and said weighted background output and applying the sum to said feedback path.

20. The apparatus as set forth in claim 19 which further comprises means for using the second correlation target signal to determine whether the target is present in the input spectrum.

21. The apparatus as set forth in claim 20 wherein a plurality of targets are to be extracted and wherein the apparatus further includes a like plurality of second channels, each operating on one of the plurality of targets.

22. The apparatus as set forth in claim 16 wherein the multispectral input spectrum has a plurality of wavelength bands, each band being in the about 2.0 to 5.5 micron range.

23. The apparatus of claim 22 wherein the spectral templates for the background and the target contain the same number of bands as in the input spectrum, and wherein the first and second channels operate simultaneously on the bands of the input spectrum.

* * * * *

UNITED STATES PATENT AND TRADEMARK OFFICE
CERTIFICATE OF CORRECTION

PATENT NO. : 5,479,255

DATED : Dec 26, 1995

INVENTOR(S) : Joseph M. Denney, Eric L. Upton

It is certified that error appears in the above-indentified patent and that said Letters Patent is hereby corrected as shown below:

On the title page, item [75], change "Denny" to --Denney--.

Signed and Sealed this

Nineteenth Day of March, 1996

BRUCE LEHMAN

Attest:

Attesting Officer

Commissioner of Patents and Trademarks